(12) United States Patent
Tsai et al.

(10) Patent No.: US 6,690,858 B2
(45) Date of Patent: Feb. 10, 2004

(54) OPTICAL COLLIMATOR AND METHOD OF ASSEMBLING SAME

(75) Inventors: Ming-Chiang Tsai, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/085,673

(22) Filed: Feb. 27, 2002

(65) Prior Publication Data

US 2003/0095747 A1 May 22, 2003

(30) Foreign Application Priority Data

Nov. 16, 2001 (TW) ........................................ 90128544 A

(51) Int. Cl.$^7$ ................................................. G02B 6/32
(52) U.S. Cl. .............................. 385/34; 385/15; 385/31; 385/33; 385/60
(58) Field of Search ............................. 385/15, 24, 27, 385/31, 33, 34, 46–48, 60, 61, 65, 78, 79, 83

(56) References Cited

U.S. PATENT DOCUMENTS

| 5,555,330 | A | * | 9/1996 | Pan et al. ...................... 385/39 |
| 5,734,762 | A | * | 3/1998 | Ho et al. ....................... 385/11 |
| 5,815,614 | A | * | 9/1998 | Pan .............................. 385/22 |
| 5,841,591 | A | * | 11/1998 | Zhu et al. ..................... 359/819 |
| 6,168,319 | B1 | * | 1/2001 | Francis ......................... 385/79 |
| 6,353,691 | B1 | * | 3/2002 | Li et al. ....................... 385/11 |
| 6,454,465 | B1 | * | 9/2002 | Uschitsky et al. ............ 385/79 |

* cited by examiner

*Primary Examiner*—John D. Lee
*Assistant Examiner*—Jennifer Doan
(74) *Attorney, Agent, or Firm*—Wei Te Chung

(57) ABSTRACT

An optical collimator comprises an optical fiber, a capillary, a GRIN lens and a glass tube. A bore is defined in the capillary. A conical depression is defined in an end of the capillary and in communication with the bore. The optical fiber is retained in the bore of the capillary. An end of the capillary is bonded with an end of the GRIN lens. The capillary and the GRIN lens are encased in the glass tube.

18 Claims, 4 Drawing Sheets

OPTICAL COLLIMATOR AND METHOD OF ASSEMBLING SAME

BACKGROUND OF THE INVENTION

1. Field of the Invention

The present invention relates to optical collimators and methods for assembling them, and more particularly to an optical collimator which has simple structure and is easily assembled.

2. Description of Prior Art

Optical fibers are becoming increasingly important in many applications involving transmission of light. Over long distances, single-mode silica optical fibers are used in optical communications networks to transmit large amounts of data with low loss and with immunity from electromagnetic interference.

The light transmitted through the fiber can also be manipulated in a variety of ways such as filtering, modulation, splitting, and combining. In most cases, two or more fibers are fed into an enclosure encasing an optical system. Input light enters the enclosure via one or more fibers, and interacts with an optical device within the enclosure. The light resulting from the interaction exits the enclosure via one or more fibers. One example of such a two-port system is an optical isolator in which two polarizers sandwiching a Faraday rotator therebetween are positioned between two fibers that have collimating lenses at their free ends. The polarization angles are set such that light can propagate in one direction through the isolator, but is prevented from propagating in the opposite direction. Another example is a dielectric interference filter which transmits or reflects selected wavelengths.

In practice, the fibers used in such optical systems are typically held in collimator assemblies which are easily aligned to the enclosure of the optical system. A commercial collimator includes as its most fundamental components the fiber, a small glass tube (sometimes referred to as a capillary) which holds an exposed end of the fiber, and a graded index (GRIN) lens. A GRIN lens used with optical fibers is a generally cylindrical piece of optical glass having a length greater than its diameter. It is fabricated to have a radially varying index of refraction that is greater toward a center thereof. Therefore, it produces a focusing effect similar to that of a conventional convex lens. Both the fiber and the GRIN lens are inserted and held in the glass tube. Thus the GRIN lens collimates light diverging from the smaller core of the optical fiber, or focuses light to the smaller core.

U.S. Pat. No. 6,168,319 discloses a collimator 100 illustrated in cross-sectional view in FIG. 1. An optical fiber 112 is received within a central axial aperture of a glass capillary 114. The fiber 112 typically includes a silica-based core, a cladding, and a surrounding polymeric coating such as that of an acrylate material. The polymeric coating is stripped from the fiber 112 at a portion thereof to be received by the capillary 114. For strength and thermal stability, the polymeric coating extends into a conical aperture (not labeled) defined in an end of the capillary 114 but does not touch the capillary 114 itself. As a result, the capillary 114 typically holds only the core and cladding of the fiber 112. Additional adhesive may be applied to strengthen the joint between the fiber 112 and the capillary 114.

The capillary 114 is slidably fitted within a central bore of a glass tube 118 snugly but easily, and is eventually bonded to the glass tube 118. A GRIN lens 120 also fits within the bore of the glass tube 118, and is bonded to the glass tube 118. The glass tube 118 encasing the capillary 114 and the GRIN lens 120 is held by an aligning apparatus. The aligning apparatus is adjusted to accurately align the capillary 114 and the GRIN lens 120. After alignment, the glass tube 118 is fitted into and bonded to a stainless steel tube 119.

Alignment of the capillary 114 and the GRIN lens 120 must be performed in the glass tube 118, and the glass tube 118 is subsequently encased in and protected by the stainless steel tube 119. The required number of components is unduly great, and complicates the assembly process. Furthermore, in order to adjust the capillary 114 and the GRIN lens 120 to be in accurate alignment, a gap between an inner end of the capillary 114 and an inner faceted end of the GRIN lens 120 must be provided to prevent the ends from rubbing against each other. Therefore, a length of the GRIN lens 120 must be less than 0.25 pitch, to ensure that a focal point of the GRIN lens 120 is beyond the inner faceted end thereof. A GRIN lens 120 having a length of 0.25 pitch cannot be used in the optical collimator 100.

Thus, it is desired to provide an optical collimator which has relatively few components and which can be easily assembled.

SUMMARY OF THE INVENTION

An object of the present invention is to provide an optical collimator having relatively few components.

Another object of the present invention is to provide an optical collimator which can be assembled easily.

To achieve the above objects, the present invention provides an optical collimator and a method of assembling the collimator. The collimator comprises an optical fiber, a capillary, a GRIN lens and a glass tube. A bore is defined in the capillary. A conical depression is defined in an end of the capillary and in communication with the bore. The optical fiber is retained in the bore of the capillary. An end of the capillary is bonded with an end of the GRIN lens. The capillary and the GRIN lens are encased in the glass tube.

Other objects, advantages and novel features of the present invention will be drawn from the following detailed description of embodiments of the present invention with attached drawings, in which:

DETAILED DESCRIPTION OF PREFERRED EMBODIMENTS

Figure 1:
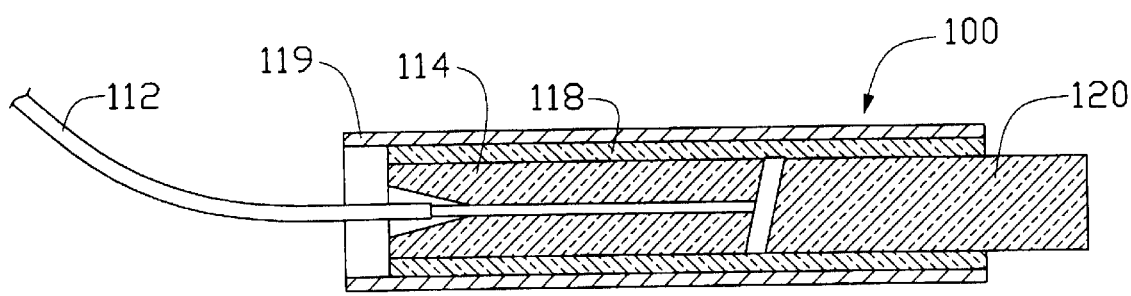
FIG. 1 is a cross-sectional view of a conventional optical collimator.
Figure 2:
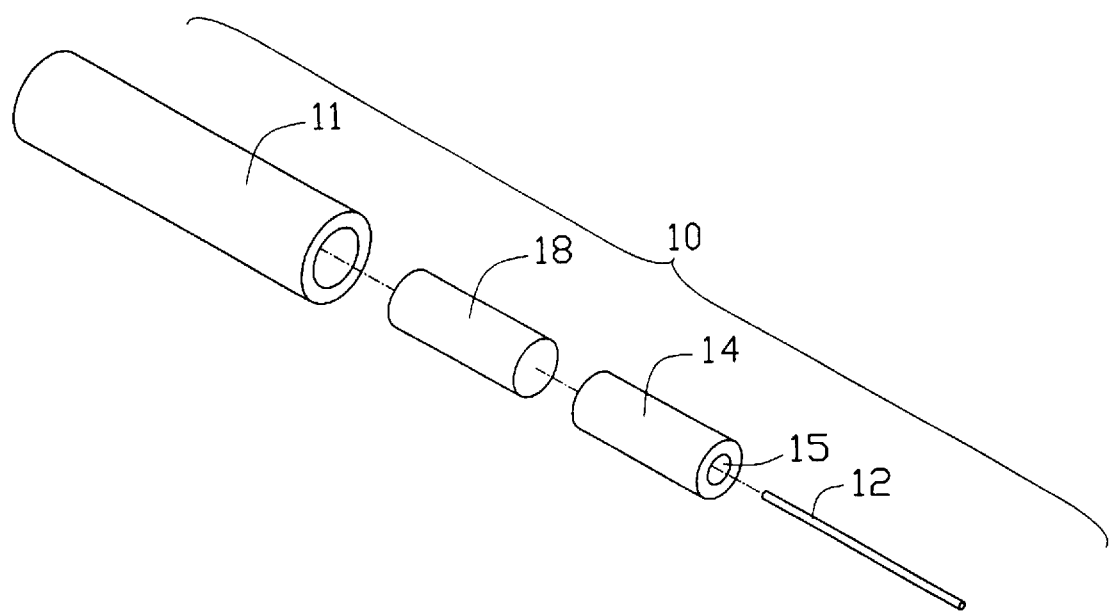
FIG. 2 is an exploded perspective view of an optical collimator in accordance with a first preferred embodiment of the present invention.
Figure 3:
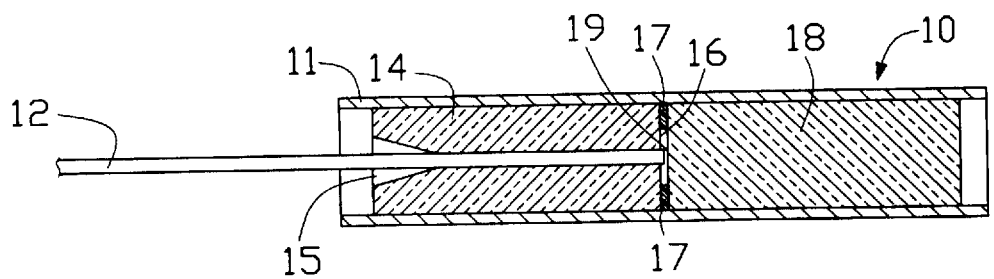
FIG. 3 is a cross-sectional view of the optical collimator in accordance with the first preferred embodiment of the present invention.

Referring to FIGS. 2 and 3, an optical collimator 10 in accordance with a first preferred embodiment of the present invention comprises an optical fiber 12, a capillary 14, a GRIN lens 18 and a glass tube 11. The optical fiber 12 comprises a silica-based core, a cladding surrounding the core, and a plastic coating surrounding the cladding. A diameter of the optical fiber 12 is preferably 250 μm approximately. The capillary 14 is made of glass material, and generally cylindrical. The capillary 14 comprises a front end 16, a rear end (not shown), and a longitudinal bore 15 defined therein. A diameter of the bore 15 is preferably 252 μm approximately. The front end 16 is planar. A conical depression (not labeled) is defined in the rear end of the capillary 14, in communication with the bore 15. The GRIN lens 18 is generally cylindrical and has a length of 0.25 pitch. The GRIN lens 18 comprises a rear end 19 and a front end (not shown). The rear end 19 is planar. A diameter of the capillary 14 is substantially equal to a diameter of the GRIN lens 18. In addition, reflection-resistant film is coated on the front end 16 of the capillary 14 and on the rear end 19 of the GRIN lens 18, so as to reduce back reflection of light. The glass tube 11 is for encasing the capillary 14 and the GRIN lens 18 therein.

Figure 4:
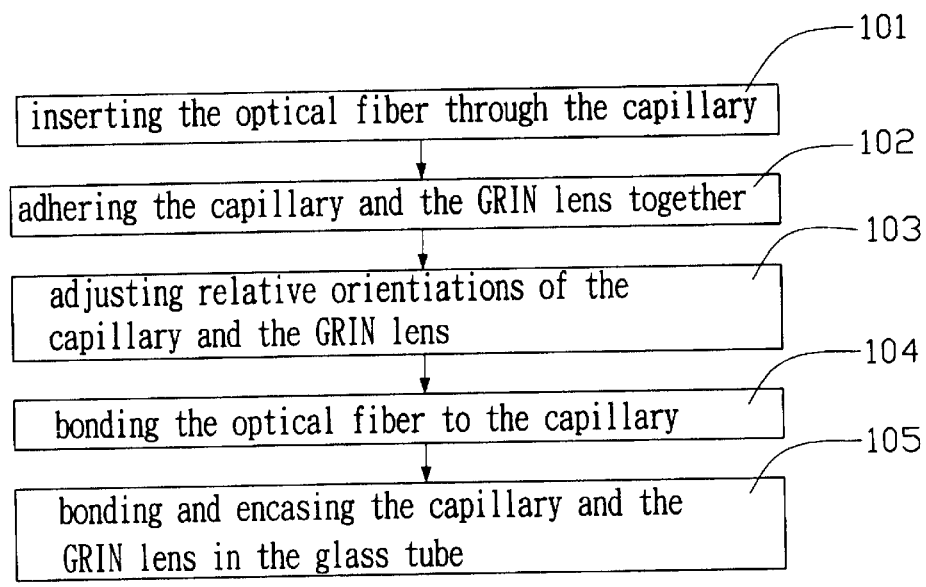
FIG. 4 is a flow chart of a method of assembling an optical collimator in accordance with the present invention.

FIG. 4 is a flow chart of a method of assembling an optical collimator in accordance with the present invention. In the case of the collimator 10, the method generally comprises:

step 101: inserting the optical fiber 12 through the capillary 14;

step 102: adhering the capillary 14 and the GRIN lens 18 to each other;

step 103: adjusting relative orientations of the capillary 14 and the GRIN lens 18;

step 104: fastening the optical fiber 12 in the capillary 14; and step 105: bonding the capillary 14 and the GRIN lens 18 in the glass tube 11.

According to the flow chart, in assembly of the collimator 10, the optical fiber 12 is inserted into the bore 15 of the capillary 14 via the conical depression. Adhesive 17 is applied between the front end 16 of the capillary 15 and the rear end 19 of the GRIN lens 18, thereby adhering the capillary 14 and the GRIN lens 18 together. The diameter of the bore 15 of the capillary 14 is slightly larger than that of the optical fiber 12, therefore the optical fiber 12 can be moved in the bore 15. The optical fiber 12 received in the bore 15 is adjusted to give the collimator 10 accurate alignment. During the alignment of the collimator 10, when optical characteristics of the collimator 10 have been optimized, the optical fiber 12 is held in place in the bore 15 with adhesive 17. Finally, the combined capillary 14, optical fiber 12 and GRIN lens 18 are encased and bonded in the glass tube 11.

In the collimator 10 of the present invention, the capillary 14 and the GRIN lens 18 are adhered together with adhesive. Therefore, a metal sleeve for encasing the glass tube is not necessary. This reduces a size of the collimator 10, simplifies its assembly, and reduces manufacturing costs. Furthermore, the front end 16 of the capillary 14 and the rear end 19 of the GRIN lens 18 adjacently abut each other. Therefore the GRIN lens 18 having a length of 0.25 pitch can be employed in the collimator 10, to improve the optical characteristics of the collimator 10.

Figure 5:
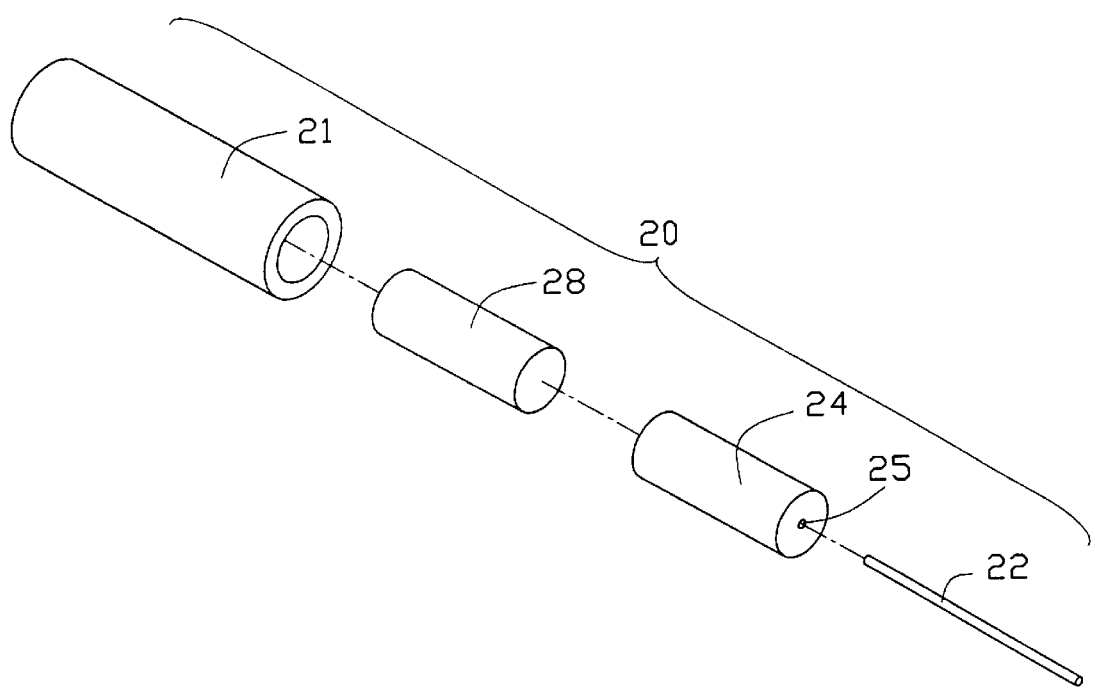
FIG. 5 is an exploded view of an optical collimator in accordance with a second preferred embodiment of the present invention.
Figure 6:
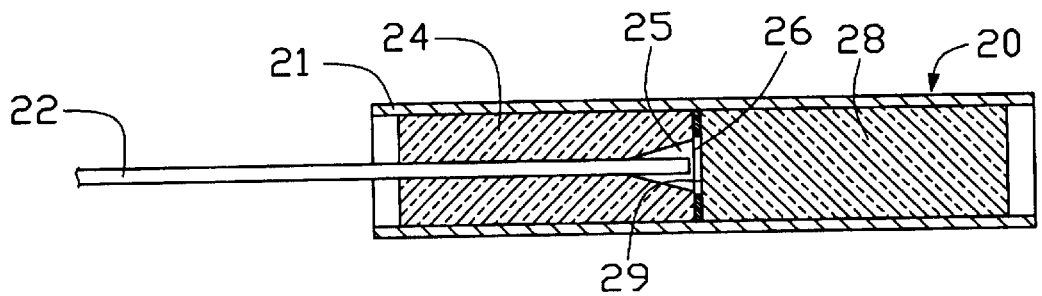
FIG. 6 is a cross-sectional view of the optical collimator in accordance with the second preferred embodiment of the present invention.

FIGS. 5 and 6 show an optical collimator 20 in accordance with a second preferred embodiment of the present invention. The collimator 20 has a structure similar to that of the collimator 10 of the first preferred embodiment. However, a GRIN lens 28 has a length of 0.23 pitch. Therefore, a focal point of the GRIN lens 28 does not lie in a rear end 29 of the GRIN lens 28. A conical depression (not labeled) is defined in a front end 26 of a capillary 24 in communication with a bore 25. This prevents light emitting from an end surface of an optical fiber 22 from being affected by the capillary 24. The collimator 20 also has a glass tube 21.

Figure 7:
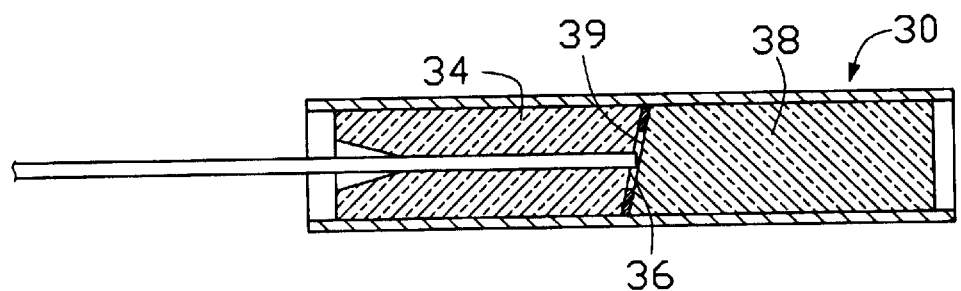
FIG. 7 is a cross-sectional view of an optical collimator in accordance with a third preferred embodiment of the present invention.

FIG. 7 shows an optical collimator 30 in accordance with a third preferred embodiment of the present invention. The collimator 30 has a structure similar to that of the collimator 10 of the first preferred embodiment. However, a front end 36 of a capillary 34 and a rear end 39 of a GRIN lens 38 are oriented at a same acute angle relative to an imaginary line that is perpendicular to a longitudinal axis of the collimator 30. The acute angle is, for example, in the range of 6–8 degrees. This prevents back reflection of light along an optical axis of the collimator 30.

Figure 8:
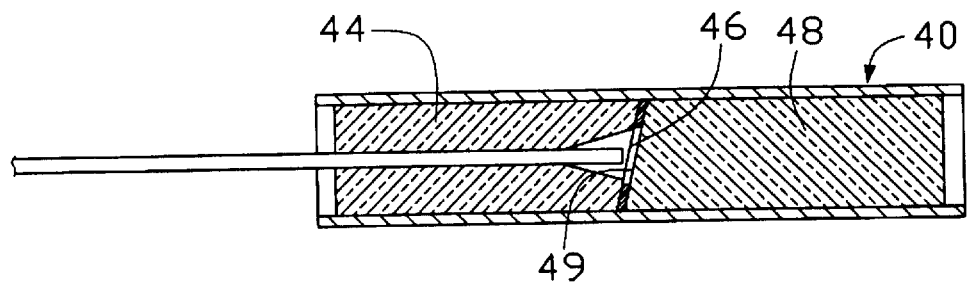
FIG. 8 is a cross-sectional view of an optical collimator in accordance with a fourth preferred embodiment of the present invention.

FIG. 8 shows an optical collimator 40 in accordance with a fourth preferred embodiment of the present invention. The collimator 40 has a structure similar to that of the collimator 20 of the second preferred embodiment. However, a front end 46 of a capillary 44 and a rear end 49 of a GRIN lens 48 are oriented at a same acute angle relative to an imaginary line that is perpendicular to a longitudinal axis of the collimator 40. The acute angle is, for example, in the range of 6–8 degrees. This prevents back reflection of light along an optical axis of the collimator 40.

A method of respectively assembling the collimators 20, 30, 40 in accordance with the present invention is similar to the method of assembling the collimator 10 as described above, with due alteration of details. Reference is made to the flow chart of FIG. 4.

Although the present invention has been described with specific terms, it should be noted that the described embodiments are not necessarily exclusive, and that various changes and modifications may be made thereto without departing from the scope of the present invention as defined in the appended claims.

What is claimed is:

1. An optical coillimator comprising:
   an optical fiber;
   a capillary comprising a front end and a rear end, the capillary defining a bore therein, the bore retaining the optical fiber therein; and
   a graded index lens having a length of about 0.25 pitch, the gradient index lens comprising a front end and a rear end; wherein said rear end of the graded index lens and said front end of the capillary are directly adhered to each other by providing end surfaces of said rear end of the graded index lens and said front end of the capillary with adhesive.

2. The optical collimator accordance wit claim 1, wherein a diameter of the capillary is substantially equal to a diameter of the graded index lens.

3. The optical collimator in accordance with claim 1, further comprising a tube encasing the capillary and the graded index lens therein.

4. The optical collimator in accordance with claim 3, wherein said front end of the capillary and said rear end of the graded index lens are planar.

5. The optical collimator in accordance with claim 3, wherein said front end of the capillary and said rear end of the graded index lens have slanted faces.

6. An optical collimator comprising:

an optical fiber;

a capillary comprising a front end and a rear end, the capillary defining a bore therein and a conical depression in said front end, the bore retaining the optical fiber therein; and a graded index lens having a length equal to or slightly less than 0.25 pitch, the graded index lens comprising a front end and rear end; wherein said rear end of the graded index lens and said front end of the capillary are adhered together by providing end surfaces of said rear end of the graded index lens and said front end of the capillary with adhesive.

7. The optical collimator in accordance with claim 6, further comprising a tube encasing the capillary and the graded index lens therein.

8. The optical collimator in accordance with claim 7, wherein said front end of the capillary and said rear end of the graded index lens are planar.

9. The optical collimator in accordance with claim 7, wherein said front end of the capillary and said rear end of the graded index lens have slanted faces.

10. The optical collimator in accordance with claim 6, wherein the graded index lens has a length of approximately 0.23 pitch.

11. A method of assembling an optical collimator, comprising the following steps:

(1) providing an optical fiber;

(2) providing a capillary defining a bore for retaining the optical fiber therein;

(3) providing a graded index lens;

(4) inserting the optical fiber through the bore of the capillary;

(5) adhering the capillary and the graded in index lens together;

(6) aligning the optical fiber and the graded index lens accurately; and (7) fastening the optical fiber in the bore of the capillary.

12. The method of assembling an optical collimator in accordance with claim 11, further comprising a step of providing a tube to encase the combined capillary, optical fiber and graded index lens therein.

13. The method of assembling an optical collimator in accordance with claim 11, wherein the capillary comprises a front end and a rear end, the capillary defines a bore therein and a conical depression in said rear end thereof, the bore retains the optical fiber therein, the graded index lens comprises a front end and a rear end, and said rear end of the graded index lens and said front end of the capillary are adhered together.

14. The method of assembling an optical collimator in accordance with claim 13, wherein the graded index lens has a length of 0.25 pitch.

15. The method of assembling an optical collimator in accordance with claim 11, wherein the capillary comprises a front end and a rear end, the capillary defines a bore therein and a conical depression in said front end thereof, the bare retains the optical fiber therein, he graded index lens comprises a front end and a rear end, and said rear end of the graded index lens and said front end of the capillary are adhered together.

16. The method of assembling an optical collimator in accordance with claim 15, wherein the graded index lens has a length of approximately 0.23 pitch.

17. The method of assembling an optical collimator in accordance with claim 11, wherein said rear end of the graded index lens and said front end of the capillary are planar.

18. The method of assembling an optical collimator in accordance with claim 11, wherein said rear end of the graded index lens and said front end of the capillary have slanted faces.

\* \* \* \* \*